United States Patent Office 3,157,658
Patented Nov. 17, 1964

3,157,658
1-CARBALKOXY-4-(9-XANTHENYL)PIPERAZINES AND RELATED COMPOUNDS
John W. Cusic, Skokie, and Peter Yonan, Chicago, Ill., assignors to G. D. Searle & Co., Chicago, Ill., a corporation of Delaware
No Drawing. Filed Dec. 26, 1963, Ser. No. 333,686
6 Claims. (Cl. 260—268)

The present invention relates to a group of carbamates of 9-xanthenyl- and 9-thioxanthenylpiperazines. More particularly, it relates to a group of compounds having the following general formula

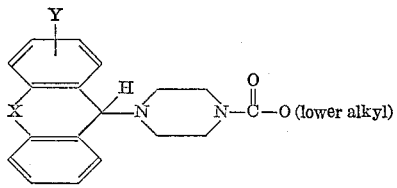

wherein X is selected from the group consisting of O and S; and Y is selected from the group consisting of hydrogen, halogen, and methyl. The lower alkyl radicals referred to in the above formula contain up to 6 carbon atoms and are exemplified by radicals such as methyl, ethyl, propyl, isopropyl, and butyl. The halogens referred to above include fluorine, chlorine, bromine, and iodine.

The compounds of the present invention are conveniently prepared by the reaction of the appropriate xanthydrol or thioxanthydrol with the appropriate 1-carbalkoxypiperazine. The reaction is conveniently carried out at reflux in an inert solvent in the presence of a weak acid. Toluene is a particularly useful solvent although benzene and xylene are examples of other solvents which can be used for this purpose. A weak acid such as acetic acid can be used to catalyze the reaction. In addition, it is useful to carry out the reaction in an apparatus equipped with a water trap so that water can be removed from the reaction mixture as it is formed.

The compounds of this invention possess valuable pharmacological properties. Thus, the present compounds are useful anti-ulcer agents. This activity is demonstrated by their inhibition of ulceration in the Shay rat. This activity is of particular interest since it involves a decrease in the amount of acid secreted by the stomach of the animal without a significant effect on the actual amount of liquid secreted. The anti-ulcer activity for these compounds is additionally interesting since they do not show activity as anti-spasmodics or ganglion-blocking agents. Activity as anti-spasmodics and ganglion-blocking agents are properties commonly associated with many anti-ulcer agents.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

Example 1

A solution of 50 parts of xanthydrol and 40 parts of 1-carbethoxypiperazine in 305 parts of toluene and 16 parts of glacial acetic acid is refluxed for 18 hours in an apparatus equipped with a water trap. The hot mixture is then treated with charcoal and filtered and the solvent is evaporated from the filtrate under reduced pressure. The residue is recrystallized first from hexane and then from a mixture of benzene and hexane to give 1-carbethoxy-4-(9-xanthenyl)piperazine melting at about 145–146° C. This compound has the following formula

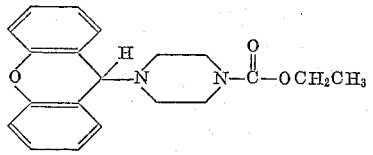

Example 2

If an equivalent quantity of 1-carbomethoxypiperazine is substituted for the 1-carbethoxypiperazine and the procedure of Example 1 is repeated, the product is 1-carbomethoxy-4-(9-xanthenyl)piperazine. This compound has the following formula

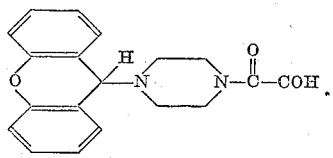

Example 3

A mixture of 10 parts of 2-chloroxanthydrol, 7 parts of 1-carbethoxypiperazine, 150 parts of toluene, and 5 parts of glacial acetic acid is refluxed for 16 hours in an apparatus equipped with a water trap. The hot mixture is treated with charcoal and filtered and the solvent is evaporated from the filtrate. The residue thus obtained is crystallized first from hexane and then from 2-propanol to give 1-carbethoxy-4-(2-chloro-9-xanthenyl)piperazine melting at about 128–129° C. This compound has the following formula

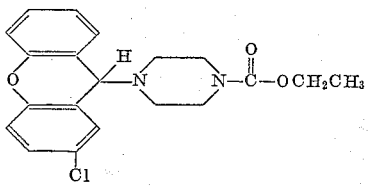

Example 4

A mixture of 11 parts of thioxanthydrol, 9 parts of 1-carbethoxypiperazine, 150 parts of toluene and 4 parts of glacial acetic acid is refluxed for 16 hours. The solvent is evaporated from the hot reaction mixture under reduced pressure to give a solid which is then recrystallized from a mixture of benzene and hexane. The product thus obtained is 1-carbethoxy-4-(9-thioxanthenyl)piperazine and it melts at about 135–136° C. This compound has the following formula

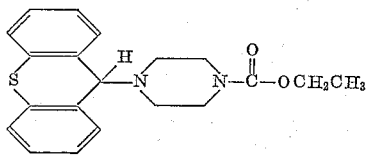

Example 5

An equivalent quantity of 1-carbomethoxypiperazine is substituted for the 1-carbethoxypiperazine and the procedure of Example 4 is repeated. The product thus obtained is 1-carbomethoxy-4-(9-thioxanthenyl)piperazine.

What is claimed is:
1. A compound of the formula

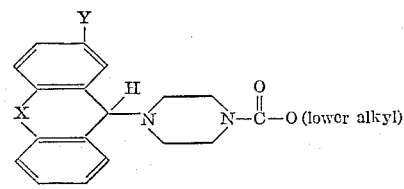

wherein X is selected from the group consisting of O and S; and Y is selected from the group consisting of hydrogen and chlorine.
2. A compound of the formula

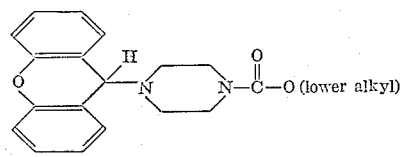

3. 1-carbethoxy-4-(9-xanthenyl)piperazine.
4. 1-carbethoxy-4-(2-chloro-9-xanthenyl)piperazine.
5. A compound of the formula

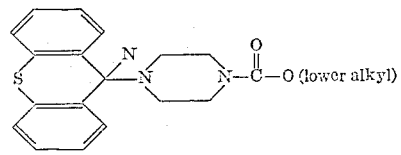

6. 1-carbethoxy-4-(9-thioxanthenyl)piperazine.

References Cited in the file of this patent
UNITED STATES PATENTS
2,902,485    Harclois _____ Sept. 1, 1959
FOREIGN PATENTS
1,002 M     France _____ Dec. 18, 1961
925,538     Great Britain _____ May 8, 1963

OTHER REFERENCES
Winthrop et al.: Journal Organic Chemistry, vol. 27, pp. 230–235 (1962).